(12) United States Patent
Fehrer et al.

(10) Patent No.: US 7,082,340 B2
(45) Date of Patent: Jul. 25, 2006

(54) PARAMETERIZATION AND DIAGNOSTIC SYSTEM FOR FIELD DEVICES

(75) Inventors: Detlef Fehrer, Gundelfingen (DE); Edgar Stadler, Emmendingen (DE); Urs Vollmer, Freiburg (DE)

(73) Assignee: Sick AG, Waldkirch/Breisgau (DE)

( * ) Notice: Subject to any disclaimer, the term of this patent is extended or adjusted under 35 U.S.C. 154(b) by 280 days.

(21) Appl. No.: 10/666,739

(22) Filed: Sep. 18, 2003

(65) Prior Publication Data
US 2004/0098143 A1 May 20, 2004

(30) Foreign Application Priority Data
Sep. 20, 2002 (DE) ............................... 102 43 782

(51) Int. Cl.
*G05B 15/00* (2006.01)

(52) U.S. Cl. ........................... 700/83; 700/79; 700/19; 700/17; 700/9; 709/223; 709/220

(58) Field of Classification Search .................. 700/83, 700/79, 19, 17, 9, 2, 3, 82; 709/220, 201, 709/210, 211, 223
See application file for complete search history.

(56) References Cited

U.S. PATENT DOCUMENTS

| | | | |
|---|---|---|---|
| 4,858,112 A | | 8/1989 | Puerzer et al. |
| 5,778,226 A | | 7/1998 | Adams et al. |
| 5,903,455 A | * | 5/1999 | Sharpe et al. .................. 700/83 |
| 6,026,352 A | * | 2/2000 | Burns et al. ................. 702/182 |
| 6,047,222 A | * | 4/2000 | Burns et al. .................... 700/79 |
| 6,076,952 A | * | 6/2000 | Gretta et al. .................... 700/83 |
| 6,094,600 A | * | 7/2000 | Sharpe et al. .................. 700/19 |
| 6,317,701 B1 | * | 11/2001 | Pyotsia et al. ............... 702/188 |
| 6,618,630 B1 | * | 9/2003 | Jundt et al. .................... 700/17 |
| 6,947,389 B1 | * | 9/2005 | Chen et al. .................. 370/252 |
| 2002/0143923 A1 | * | 10/2002 | Alexander .................. 709/223 |

FOREIGN PATENT DOCUMENTS

| | | |
|---|---|---|
| DE | 42 29 931 | 3/1994 |
| DE | 44 17 434 | 11/1995 |
| DE | 195 43 036 | 12/1996 |
| DE | 196 15 190 A1 | 10/1997 |
| DE | 196 46 219 | 12/1997 |
| DE | 693 15 785 | 4/1998 |
| DE | 197 00 353 | 7/1998 |
| DE | 199 40 230 | 3/2000 |
| DE | 198 47 701 | 4/2000 |
| DE | 198 49 810 | 5/2000 |

(Continued)

*Primary Examiner*—Anthony Knight
*Assistant Examiner*—Thomas Pham
(74) *Attorney, Agent, or Firm*—Harness, Dickey & Pierce

(57) ABSTRACT

A system is described for the diagnosis and/or for the parameterization of devices forming sensors, actuators or controls and connected to a bus system, with device parameters being able to be read out of the device and/or being able to be transmitted into the device and well as device parameters read out and/or to be transmitted being able to be displayed visually by a display unit using said system. The system includes a communication engine for the communication, i.e. for the reading out and/or transmission of device parameters, of the system with the device and a visualization engine separate from the communication engine for the visualization of the device parameters by the display unit. The communication engine and the visualization engine are connected to one another via device-independent interfaces for the exchange of data. Furthermore, the communication engine is made independently of the display unit used.

8 Claims, 3 Drawing Sheets

FOREIGN PATENT DOCUMENTS

| | | |
|---|---|---|
| DE | 199 52 391 | 6/2000 |
| DE | 199 19 473 | 11/2000 |
| DE | 100 57 625 | 5/2001 |
| DE | 694 28 512 | 5/2002 |
| DE | 101 09 196 | 9/2002 |
| EP | 0 825 506 A2 | 2/1998 |
| EP | 1 199 846 | 4/2002 |
| EP | 1 280 027 A1 | 1/2003 |
| WO | WO 00/077592 A3 | 12/2000 |
| WO | WO 01/69334 A1 | 9/2001 |

\* cited by examiner

PARAMETERIZATION AND DIAGNOSTIC SYSTEM FOR FIELD DEVICES

CROSS-REFERENCE TO RELATED APPLICATIONS

This application claims priority to German Patent Application No. 102 43 782.3 filed Sep. 20, 2002, which application is herein expressly incorporated by reference.

BACKGROUND OF THE INVENTION

The present invention relates to a system for the diagnosis and/or for the parameterization of devices forming sensors, actuators or controls and connected to a bus system, with device parameters being able to be read out of the device and/or being able to be transmitted into the device and device parameters read out and/or to be transmitted being able to be displayed visually by a display unit using said system.

Systems in the form of PC-based programs (engineering tools) are usually used in automation engineering for the diagnosis and/or parameterization of field devices. These systems communicate with the respective device via a pre-determined, usually standardized communication technology (serial interface, Ethernet, PROFIBUS, etc.) and make a user-friendly graphical visualization available at the display unit, usually at the monitor directly connected to the PC, which is as a rule not possible at the device itself. This visualization represents parameters read out from the device, for example, in graphical, tabular or numerical form at the monitor and, optionally, makes entry screens available via which the corresponding device parameters can be entered and transmitted to the respective device for the parameterization.

If the visualization should not take place in the direct proximity of the field device, since the operator is, for example, a long way away from the field device, it is, for instance, also possible to control the field devices via web accesses by means of HTTP (on an Ethernet or another carrier technology). For this purpose, it is necessary for the data server to be arranged in direct proximity to the field device and to be connected to it, for example, via a local interface, whereas the web accesses via HTTP can be carried out by a remotely disposed client.

It is a problem with the previously known solutions that a number of different systems admittedly exist which can each be used for different application scenarios, but that these different systems do not have any common architecture. This results in the known systems presenting themselves to the user in different visualization and operation concepts in dependence on the application scenario. The user must thus frequently accustom himself completely from the start to the respectively used system, whereby the probability of operator errors is increased. Furthermore, version conflicts frequently arise between the device software and the parameterization software since these are usually developed independently of one another and version releases in the software modules used are frequently not taken into account on a change in the application scenario. Finally, a parameterization is normally only possible locally at the field device without a technical bridge, for example via the connection of a laptop, or at most only to the extent that the bus system extends in the system used.

SUMMARY OF THE INVENTION

It is an object of the invention to design a system of the initially named kind such that the operation and visualization of the diagnostic and/or parameterization system is as uniform as possible for all field devices for a variety of different application scenarios. Furthermore, a migration of the system from one application scenario into another application scenario should be possible without any great effort.

Starting from a system of the initially named kind, this object is satisfied in accordance with the invention in that the system includes a communication engine for the communication, i.e. for the reading out and/or for the transmission of device parameters, of the system with the device as well as a visualization engine separate from the communication engine for the visualization of the device parameters by the display unit, with the communication engine and the visualization engine being connected to one another via device-independent interfaces for the exchange of data and the communication engine being formed independently of the display unit used.

In accordance with the invention, a strict division of the system into two engines separate from one another is thus made, with the communication engine encapsulating the core independent of the respective application scenario, whereas the visualization engine is dependent on the application scenario. Possible scenarios within the framework of this application are, for example, a stand-alone scenario, a tool server scenario and an embedded webserver scenario, as will be described in more detail in the following.

In the stand-alone scenario, the system is advantageously integrated into a control unit in particular formed as a personal computer, with the display unit being formed by a display of the control unit directly connected to the control unit. The engineering tool can thus run on a PC which is arranged locally at the field device, with the visualization being made available directly on the monitor of the PC.

The visualization engine can preferably be made as a module which is carried out directly on the PC.

In the tool server scenario, the system is advantageously integrated into a control unit in particular formed as a personal computer, with the display unit being formed by a further computer with a display (display computer) which is connected to the control unit via a network connection. In this case, the engineering tool can thus run on a PC which is arranged locally at the field device, with the visualization, which is the same as with the stand-alone scenario, being provided to a client far away by, for example, via a webserver by means of HTTP. This can take place, for example, via an intranet or also via the Internet. A transparent remote maintenance is possible in this manner, i.e. for the local operator to have the same screen interface as a remote access. The network connection can advantageously be realized by a standardized network connection, in particular by an Ethernet connection or by a fieldbus (e.g. Profibus, DeviceNet, Can-based fieldbus).

The visualization engine (display front end) can be implemented as a module, in particular as an applet, which can be loaded into the display computer via the network connection for the visualization of the device parameters and which can be carried out in a client present on the display computer, in particular in an Internet browser.

In the embedded webserver scenario, the system is advantageously integrated into the field device itself, with the display unit being formed by a computer having a display (display computer) which is connected to the device via a network connection. The network connection can here also advantageously be realized by a standardized network connection, in particular via an Ethernet connection or via a field bus (e.g. Profibus, DeviceNet, Can-based fieldbus).

In this case, a suitable field device can thus receive the whole engineering tool within it and can make its visualization available externally via a webserver, for example. This webserver is integrated directly into the device in this case. The visualization is in this case identical to the visualization in the stand-alone scenario and also in the tool server scenario. It is advantageous in the embedded webserver scenario that all version conflicts between the device and the engineering tool disappear since the total device logic, including the engineering tool, is concentrated in the device itself.

The visualization engine can, in an identical manner as with the tool server scenario, be realized as a loadable module, in particular as an applet, which can be loaded onto the display computer via the network connection for the visualization of the device parameters and can be carried out in a client, in particular in an Internet browser, present on the display computer. The tool core contained in the communication engine can be realized directly in the device, for example in an embedded Java environment.

In accordance with an advantageous embodiment of the invention, interfaces are provided between the communication engine and the visualization engine which are identical for all scenarios. The actual data are in the communication engine, with in particular four main interfaces being provided between the communication engine and the visualization engine. These main interfaces, which are identical for all scenarios, include interfaces to the core, to the actual device object, to the device parameters and to the project management via a plurality of devices.

The network channel used in the tool server scenario and in the embedded webserver scenario is transparent, i.e. it is invisible for the data transported via it. The business level and the presentation level, i.e. the communication engine and the visualization engine, are connected to one another via the transparent network channel. The transparency of the network channel is achieved in that the same interface, which also lies between the transmitted data packets in the stand-alone scenario, is provided at both sides of the channel. It is ensured in this manner that the communication between the communication engine and the visualization engine is identical irrespective of the respectively applicable scenario. In the stand-alone scenario, the implementation of the communication engine and of the visualization engine on the same PC means that they are directly connected to one another so that no network channel is present here.

It is achieved with the invention that a system formed in accordance with the invention has an identical visualization irrespective of on which platform or in which application scenario the system is carried out. Furthermore, it is ensured by the isolation and decoupling of the communication engine (device components) that these can be integrated or migrated into the different architectures in unchanged form. It is in turn achieved by the decoupling of the visualization engine that a uniform visualization is provided for different devices. The communication engine of the respective device (optionally with business logic) which represents the core package remains independent and unchanged for every application scenario due to the decoupling.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
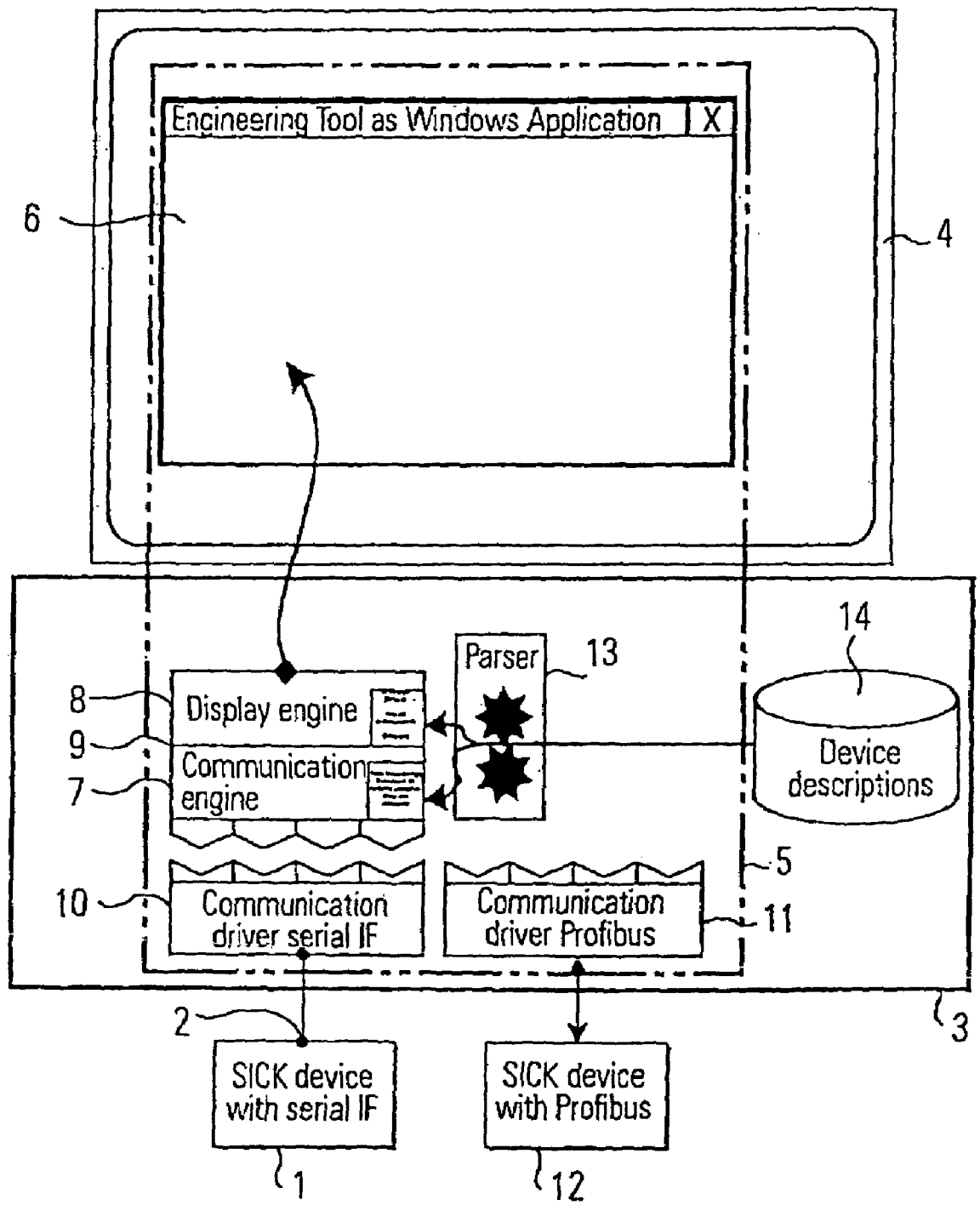
FIG. 1 is a first embodiment of the invention in a so-called stand-alone scenario.

FIG. 1 shows a field device 1 which is formed as a sensor, an actuator or a control and which is connected to a control unit formed as a personal computer 3 via a serial interface 2. The personal computer 3 is connected in a customary manner to a screen 4 and to input devices which are not shown (keyboard, mouse).

A diagnostic/parameterization tool (engineering tool) 5, which is made as a Windows application, for example, and which allows inputs or outputs via a user interface 6 represented on the screen 4, is installed on the personal computer 3. The engineering tool 5 includes a communication engine 7 and a visualization engine 8 formed separately therefrom, both communicating via interfaces 9 not shown in more detail. The actual device logic (business logic) is implemented in the communication engine 7, with at the same time no parts required for the visualization on the screen 4 being contained in the communication engine 7. The parts required for the visualization are completely implemented in the visualization engine 8. In the case of the stand-alone scenario represented in FIG. 1 the visualization engine 8 is designed as a frame.

The engineering tool 5 furthermore includes a communication interface 10 for the communication with the field device 1 via the serial interface 2. Generally, a plurality of communication interfaces can be provided for different applications of different field devices. For example, a communication interface 11 is thus also represented in FIG. 1 for the connecting of a field device 12 using a PROFIBUS connection.

Furthermore, the engineering tool 5 includes a parser 13 by which a device description 14 stored in the memory of the personal computer 3 is read out and prepared for processing.

In the stand-alone scenario represented in FIG. 1, both the communication engine 7 and the visualization engine 8 thus run together on the personal computer 3. This personal computer must be provided in spatial proximity to the devices 1 and 12 since the connection via the serial interface 2 or via the PROFIBUS is only possible in this case.

Figure 2:
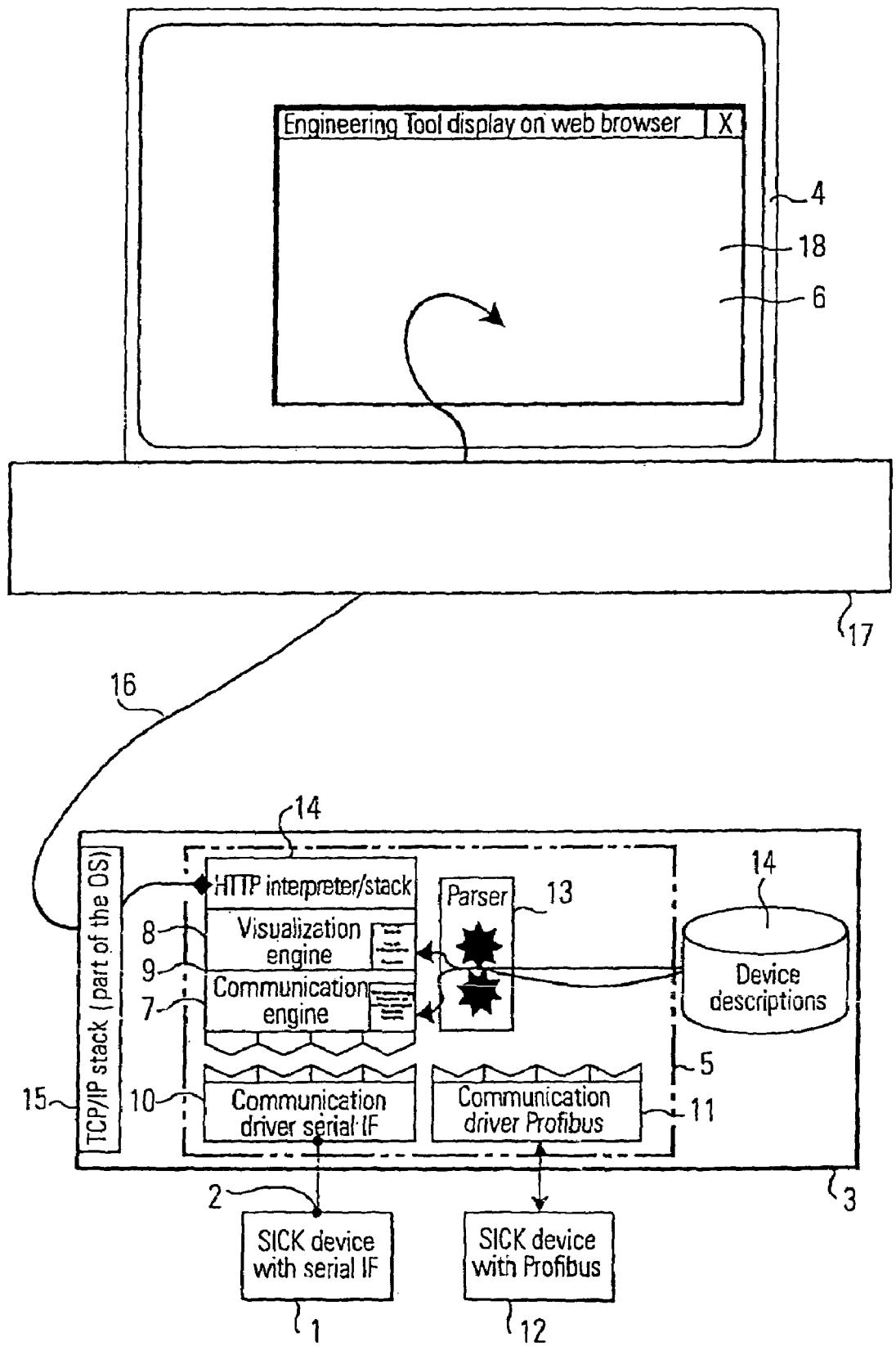
FIG. 2 is a second embodiment of the invention in a tool server scenario.

In contrast, the arrangement shown in FIG. 2 represents the so-called tool server scenario. In this tool server scenario, a control unit is generally also provided in the direct proximity of the devices to be controlled in the form of a personal computer, but the display unit is optionally arranged likewise in the direct proximity of or far away from the devices to be controlled. The same reference numerals are used in the following description of FIG. 2 for the same elements as in FIG. 1.

The tool server scenario shown in FIG. 2 differs from the stand-alone scenario in accordance with FIG. 1 in that the visualization engine 8 additionally includes a webserver 14 which provides the visualization to a client (web browser) arranged far away via a transparent network channel 15, for example via a TPC/IP stack. The data transmission takes place, for example, via an intranet or via the Internet 16, with the client being installed in a customary manner on a personal computer acting as the display computer 17 and having a connection to the intranet/Internet 16.

In this case, the visualization engine 8 can be formed as an applet (for example as a Java applet) which is loaded onto the display computer 17 via the intranet/Internet 16 and is used by the browser 18 for the visualization of the device parameters.

The communication engine 7 is formed identically to the communication engine 7 in accordance with FIG. 1 in the embodiment in accordance with FIG. 2 such that the actual business logic is always identical irrespective of the respective application scenario. The visualization engines 8 are implemented in the different application scenarios such that ultimately the user interface 6 is identical for the user irrespective of the application scenario.

Figure 3:
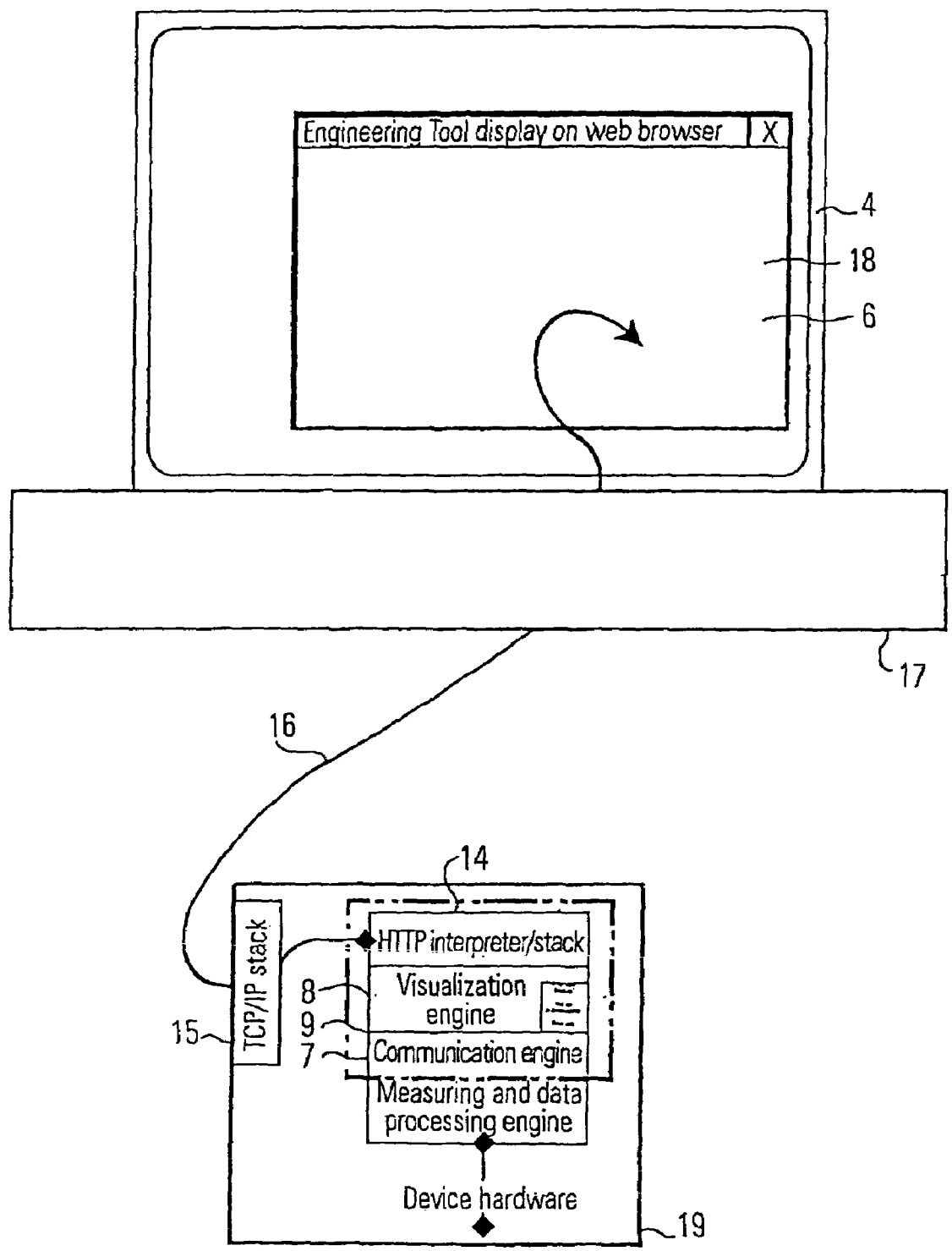
FIG. 3 is a third embodiment of the invention in an embedded webserver scenario.

This applies likewise to the embedded webserver scenario shown in FIG. 3. Here, with respect to the embodiment of FIG. 2, the whole engineering tool 5 is directly integrated into the device 19 itself. As in the tool server scenario of FIG. 2, the visualization also takes place in the embedded webserver scenario of FIG. 3 via a webserver present in the visualization engine 8. It is achieved in this manner that ultimately a visualization and thus a user interface 6 identical to the embodiments of FIG. 1 and FIG. 2 are achieved on a display computer 17 connected remotely via, for example, the intranet/Internet 16. The communication engine 7 can, as shown in FIG. 3, be made as an engine separate from the business logic 20. It is, however, also possible to integrate the communication engine 7 directly into the business logic 20 such that the communication engine 7 is made as part of the business logic 20. In both embodiments, the business logic of the device and the communication engine are integrated directly into the device such that all version conflicts between the device and the engineering tool disappear in this scenario.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A system for the diagnosis and for the parameterization of devices (1, 12, 19) forming sensors, actuators or controls and connected to a bus system, wherein device parameters can be read out of the device (1, 12, 19) and can be transmitted into the device (1, 12, 19) and device parameters read out and to be transmitted can be displayed visually by a display unit (17, 4) using said system, characterized in that the system includes a communication engine (7) for the communication, defined by the reading out and the transmission of device parameters, of the system with the device (1, 12, 19) as well as a visualization engine (8) separate from the communication engine (7) for the visualization of the device parameters by the display unit (17, 4), with the communication engine (7) and the visualization engine (8) being connected to one another via device-independent interfaces (9) for the exchange of data and the communication engine (7) being formed independently of the display unit (17, 4) used; that the system is integrated into the device (19); and that the display unit is formed by a computer (17) having a display (4) (display computer) which is connected to the device (19) via a network connection (15, 16).

2. A system in accordance with claim 1, characterized in that the network connection (15, 16) is formed by a standardized network connection, in particular by an Ethernet connection or by a fieldbus.

3. A system in accordance with claim 1, claim, characterized in that the visualization engine (8) includes a webserver (14).

4. A system in accordance with claim 1, characterized in that the visualization engine (8) includes a module, in particular an applet, which can be loaded into the display computer (17) via the network connection (15, 16) for the visualization of the device parameters and can be carried out in a client (18), in particular in an Internet browser, present on the display computer (17).

5. A system in accordance with claim 1, characterized in that interfaces (9) for core functionality and/or for the device object and/or for device parameters and/or for project management are provided between the communication engine (7) and the visualization engine (8).

6. A system in accordance with claim 1, characterized in that the communication engine (8) is made separately from a business logic (20) of the device (1, 12,19).

7. A system in accordance with claim 1, characterized in that the communication engine (7) is integrated into a business logic (20) of the device (1, 12, 19).

8. A system in accordance with claim 1, characterized in that the visualization engine (8) effects a substantially identical visualization by the respectively used display unit (17, 4) irrespective of the used display unit (17, 4).

* * * * *